G. SMITH.
CALK FOR HORSESHOES.
APPLICATION FILED AUG. 26, 1916.

1,236,494.

Patented Aug. 14, 1917.

Inventor
George Smith
By his Attorney
W. T. Criswell

UNITED STATES PATENT OFFICE.

GEORGE SMITH, OF NEW YORK, N. Y.

CALK FOR HORSESHOES.

1,236,494.

Specification of Letters Patent.

Patented Aug. 14, 1917.

Application filed August 26, 1916. Serial No. 117,012.

*To all whom it may concern:*

Be it known that I, GEORGE SMITH, a citizen of the United States, and a resident of New York, county and State of New York, have invented a certain new and useful Improvement in Calks for Horseshoes, of which the following is a full, clear, and exact specification.

This invention relates to a class of devices adapted to be applied on the hoofs of horses.

My invention has for its object primarily to provide a device, or calk designed to be utilized on the shoe of a horse for rough shodding the animal, whereby it may be prevented from falling when traveling on slippery highways, and which is of a form adapted to be easily and quickly applied to the shoe for use in emergency. The invention consists essentially of a body which is substantially U-shaped so as to be disposed in straddle arrangement on the underside of a horseshoe, and projecting downwardly from the underside of this U-shaped body is a gripping member, or tooth, or lug of approximately the shape of a V to provide a free cutting edge for engaging the surface of the highway in a manner whereby the hoof of the animal will be prevented from slipping thereon.

A further object of the invention is to provide a calk of a simple, efficient and durable construction which is susceptible of being made so as to be applied to horseshoes of any size.

A practical embodiment of the invention is represented in the accompanying drawing forming a part of this specification in which similar characters of reference indicate corresponding parts in all the views, the said invention being more fully described hereinafter, and then pointed out in the claim at the end of the description.

In the drawing, Figure 1 is a perspective view of a horseshoe showing the manner of using my improved calk in conjunction therewith.

Figure 1:
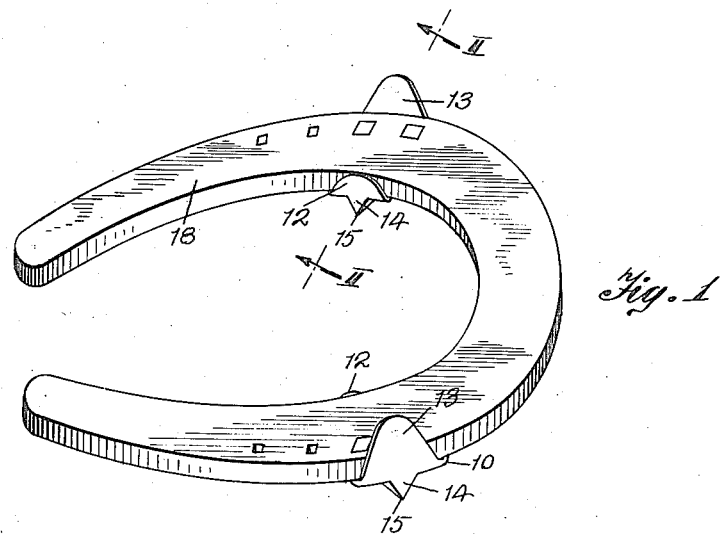

The device, or calk has a body 10 which may be approximately U-shaped to provide a longitudinally disposed base-plate 11, an upwardly extending member, or rear flange 12, and a second upwardly projecting member, or front flange 13 which is spaced from the rear flange. The base-plate is preferably substantially oval, and its top surface is disposed on a slight incline, as shown, so that the plate will be thicker at the front flange 13 than at the rear flange 12 to compensate for a variation in the thickness of a horseshoe when the front edge thereof has been reduced by wear, in order to permit the base-plate of the calk to evenly fit the underside of the horseshoe when applied thereto. The rear flange 12 is made of a height corresponding to the average thickness of a horseshoe, and this flange may be formed with a curved edge. The front flange may be formed with a curved tapered edge, and this flange is considerably greater in height than the rear flange so as to overlap part of the hoof of the animal, as will be hereinafter more fully explained.

On the underside of the base-plate 11 of the U-shaped body 10, and disposed transversely of the plate from the front flange 13 to the rear flange 12, is a gripping member, or tooth, or lug 14. The gripping member 14 extends downwardly from the base-plate, and this member is preferably of substantially a V-shape, as viewed transversely, to provide a cutting edge 15 for engaging the surface of a slippery highway whereby the hoof of the animal will be prevented from slipping, and at spaced intervals through the base-plate 11 contiguous to the front flange 12 are two holes 16 and 17 arranged so as to be registered with a pair of the holes of a horseshoe to allow nails to be guided therethrough for being driven into the hoof of the animal, though any other suitable means may be employed for securing the calk on the shoe.

Figure 2:
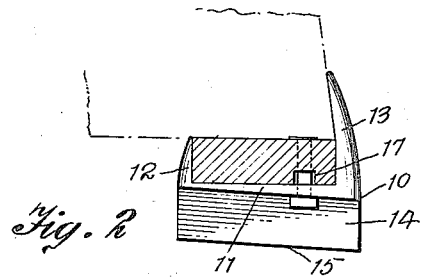
Fig. 2 is a view partly in section taken on the line II—II of Fig. 1.
Figure 4:
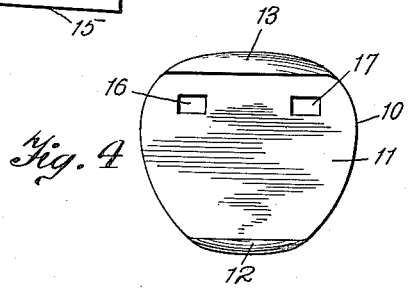
Fig. 4 is a top plan of the calk.
Figure 3:
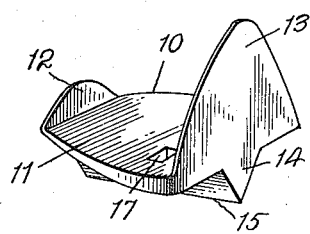
Fig. 3 is a perspective view of the calk.
Figure 5:
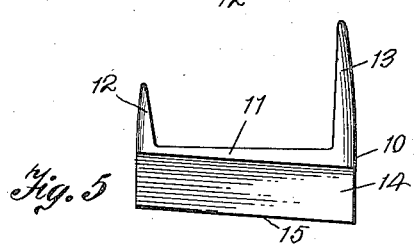
Fig. 5 is a side elevation thereof.

To roughshod an animal by the use of my calk two of the devices are preferably employed on each shoe, as 18, of the hoofs of the animal. The calks are preferably disposed on the underside of the shoe in straddle arrangement so that the rear flange 12 will be adjacent to, or in contact with the inner edge of the shoe, and the front flange 13 will be adjacent to, or in contact with the outer edge of the shoe, each calk being also arranged so that its holes 16 and 17 will be in register with two of the holes of the shoe. The V-shaped gripping member 14 will then be disposed crosswise underneath the shoe so that its cutting edge 15 will be forced into the surface of the highway as the animal moves. Two nails are then passed through the holes 16 and 17 of each calk and through the holes of the shoe in register therewith as well as being driven through the hoof of the animal, and part of the upper end of the front flange 13 of each calk may be bent over to lap on the animal's hoof, as illustrated in Fig. 2. The calks will thereby be tightly secured on the shoe of the animal for preventing the animal from falling when traveling on slippery highways, and by providing a calk of this type it may be easily and quickly applied to a horseshoe in emergency as well as being adapted to be readily removed from the shoe when desired by simply extracting the nails from the horse's hoof and from the shoe and calk in the usual manner.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope thereof.

Having thus described my invention, I claim as new and desire to secure by Letters Patent:—

A calk comprising a base plate tapering in longitudinal cross-section the full width thereof, a rear flange on said plate extending upwardly from the thin edge thereof, a front flange on said plate extending upwardly from the thick edge thereof, and a depending V-shaped gripping member formed integral with said plate, said gripping member extending longitudinally of the plate from the front to the back thereof and the cutting edge of said gripping member being so disposed as to form an angle with the plane of the upper surface of the base plate, the front and rear ends of said member lying in the same plane surface as and being in effect a continuation of the outer sides of the front and rear flanges respectively.

This specification signed and witnessed this 25th day of August, A. D. 1916.

GEORGE SMITH.

Witnesses:
GEORGE F. BENTLEY,
VINCENT S. LIPPE.